Feb. 13, 1968 D. G. KEITH 3,369,065
METHOD AND APPARATUS FOR PRODUCING A LAMINATED BOARD
Filed Dec. 2, 1964 2 Sheets-Sheet 1
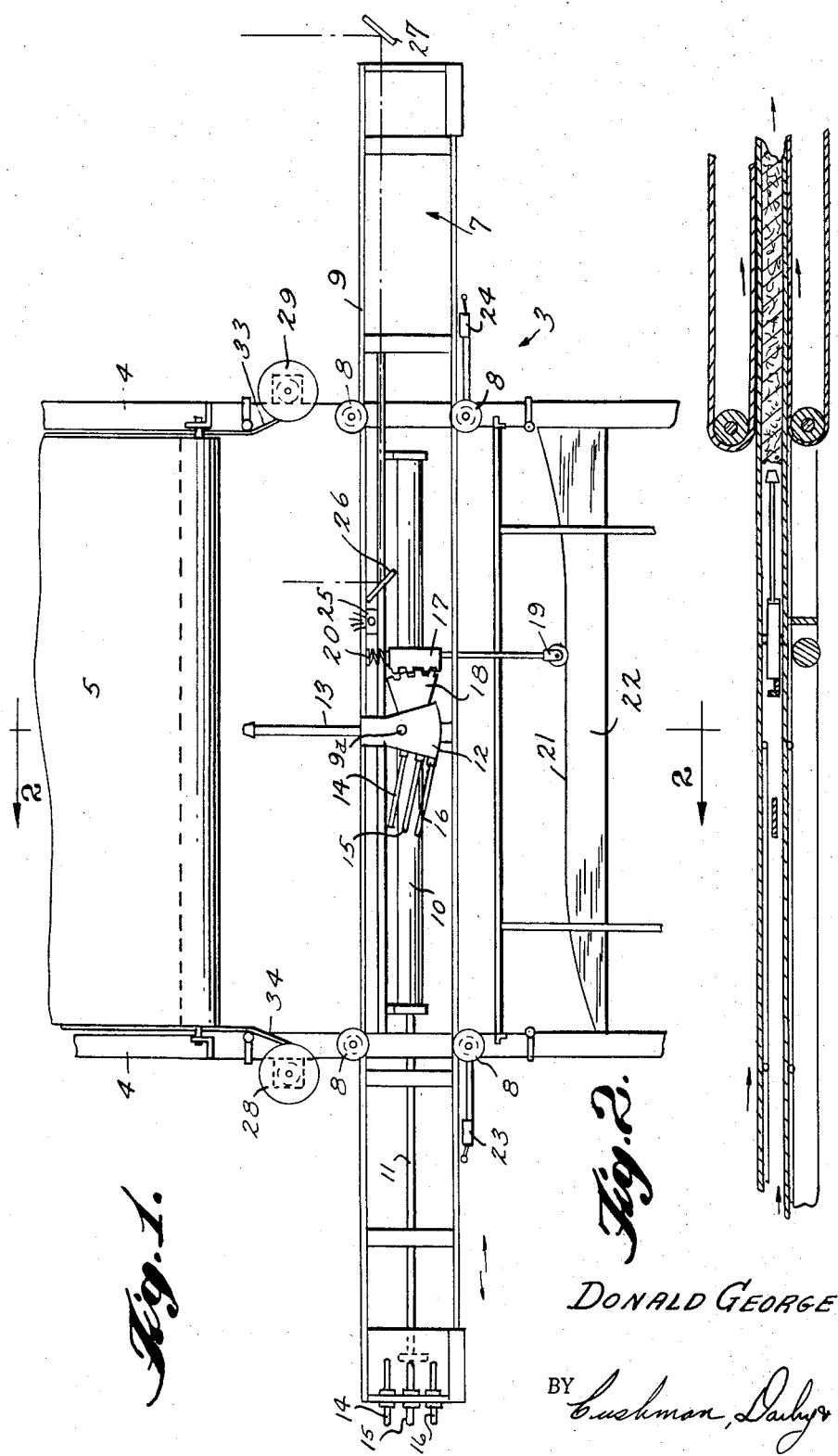
INVENTOR
DONALD GEORGE KEITH
BY
Cushman, Darby & Cushman
ATTORNEYS Feb. 13, 1968  D. G. KEITH  3,369,065
METHOD AND APPARATUS FOR PRODUCING A LAMINATED BOARD
Filed Dec. 2, 1964  2 Sheets-Sheet 2

INVENTOR
DONALD GEORGE KEITH

BY Cushman, Darby & Cushman
ATTORNEYS

United States Patent Office 3,369,065
Patented Feb. 13, 1968

3,369,065
METHOD AND APPARATUS FOR PRODUCING
A LAMINATED BOARD
Donald George Keith, Mount Eliza, Victoria, Australia, assignor to Imperial Chemical Industries of Australia and New Zealand Limited, Melbourne, Victoria, Australia, a company of Australia
Filed Dec. 2, 1964, Ser. No. 415,257
5 Claims. (Cl. 264—47)

ABSTRACT OF THE DISCLOSURE

Apparatus for and a method of continuously producing rigid skinned foam (particularly polyurethane) sandwiches wherein a dispensing nozzle reciprocates between rigid sheets prearranged in the desired respective positions and the nozzle is deflected towards the interior of the sandwich board to avoid overspray at the point of reciprocation.

Figure 3:
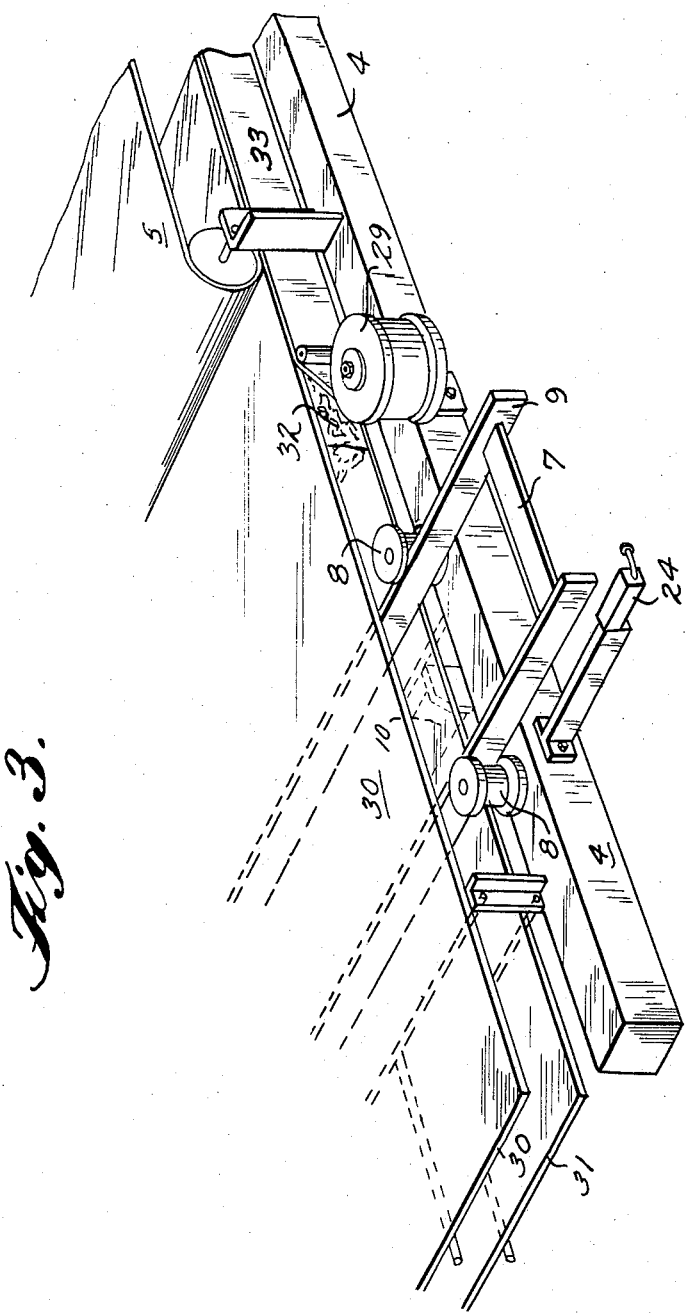

This invention relates to the continuous production of rigid skinned foam sandwich board suitable for light structural work such as ceiling lining and general insulation and comprising substantially rigid outer layers, for example wooden sheets, wall board, flat or ribbed aluminum sheets, flat or corrugated steel sheets, or asbestos cement sheets, bonded together by a core of polyurethane foam. The foam may be produced by mixing ingredients to form a liquid mixture, hereinafter termed a "latent-foaming polyurethane liquid," which after a short period, for example 10 seconds, begins to react producing a cellular polyurethane mass which sets on further standing, for instance for one minute. The sandwich board may be produced by applying the latent-foaming polyurethane liquid between the inwardly facing surfaces of the outer layers, and allowing the liquid to react, foam and set thereby uniting the layers in an integral structure.

In producing structures of the present type there were certain problems which had to be overcome, for example the problem of obtaining an even distribution of the foam between the two rigid skins while achieving a commercialy acceptable rate of production.

It is the principal object of the present invention to provide a method and apparatus for producing a rigid skinned foam sandwich board of uniform structure by means of a continuous process.

In order to achieve this principal object, the present invention provides a method of continuously producing rigid skinned foam sandwich board, comprising the steps of continuously moving two substantially rigid sheets one above the other at the spacing of the finished sandwich board horizontally up to and past a dispensing station, at the dispensing station reciprocating a single dispenser nozzle laterally between the sheets, supplying through the dispenser nozzle to the upper surface of the lower sheet a latent-foaming liquid capable of forming solid polymeric foam and maintaining the spacing of the skins constant during foaming and solidification of the latent-foaming liquid.

In another aspect the present invention provides apparatus for continuously producing rigid skinned foam sandwich board comprising: first support means maintaining two horizontal substantially rigid sheets constituting the skins spaced one above the other at the spacing of the finished sandwich board, a dispensing nozzle carried by said first support means, means reciprocating the nozzle laterally between the sheets, means supplying to the nozzle a latent-foaming liquid, board conveying means, and second support means limiting the separation of the sheets during foaming and solidification of the latent-foaming liquid.

Latent-foaming liquids are known from the art of producing plastic foams. Preferred latent-foaming liquids are the mixtures known to produce the polymers referred to in practice as polyurethanes.

Preferably the nozzle is intermittently turned laterally with respect to the direction of travel of the sheets during reciprocation of the nozzle. For example, turning of the nozzle may be effected in response to the movement of a cam-follower over a shaped surface.

Most preferably the nozzle is turned toward the interior of the space between the sheets as the nozzle approaches each limit of reciprocation. The nozzle may, for example, be turned in response to the movement of a cam-follower over a shaped control member.

Containing the foam within the confines of the two rigid outer skins can be achieved by means of a tape affixed to the outer edges of the rigid outer skins as they progressively move forward in the horizontal direction.

One practical arrangement of a method and apparatus according to this invention for producing building boards will now be described with reference to the accompanying drawings. In these drawings:

FIG. 1 is a plan of the apparatus;
FIG. 2 is a cross-section on the line 2—2 of FIG. 1, and
FIG. 3 is a perspective view of part of the apparatus looking in the direction of the arrow 3 in FIG. 1.

Referring now to the drawings, the apparatus comprises a pair of rigid, parallel horizontal frame members 4, 4 supporting endless band conveyors 5, 6 located one above the other between the members 4, 4. The conveyors 5, 6 are so arranged and supported that the adjacent runs are firmly maintained parallel at a spacing equal to the total thickness of the finished building panel, e.g. two and a half inches, and co-operate to convey the panel towards the discharge end of the apparatus. A foam dispenser 7 is supported by four rollers 8 mounted on the members 4 at a location adjacent to the receiving end of the conveyors 5 and 6, to reciprocate at right angles across the members 4.

The foam dispenser 7 comprises a frame 9 driven back and forth across the members 4 by a pneumatic double-acting cylinder 10 and piston rod 11 under the control of limit switches 23 and 24. A mixing chamber 12 for a latent-foaming polyurethane liquid is pivoted at 9a to the frame 9 for limited arcuate movement in a horizontal plane. A dispensing nozzle 13 opening from the mixing chamber 12 terminates short of the conveyors 5 and 6. The ingredients for the latent-foaming polyurethane liquid are supplied separately to the mixing chamber 12 through three flexible pipes 14, 15 and 16 which, for clarity, are not shown throughout their entire length in FIG. 1.

The mixing chamber 12 and the attached nozzle 13 are turned inwardly about the pivot 9a as the frame 9 approaches either end of its travel by a rack 17 engaging with a gear sector 18 fixed to the chamber 12. The movement of the rack 17, and therefore of the chamber 12 and nozzle 13, is controlled by the cam-follower 19 pressed by a spring 20 against a shaped surface 21 formed upon a fixed rigid control member 22.

An electric light globe, lens and reflector assembly 25 mounted on the frame 9 directs an intense light beam between the conveyors 5 and 6. A mirror 26 mounted at 45° to the members 4 upon the frame 9, by co-operation with a similar mirror 27 rigidly mounted upon the members 4 at 45° to the said members, permits an operator, standing in front of the dispenser 7, to observe the space between the conveyors 5 and 6.

A pair of tape dispensing reels 28 and 29 is carried upon vertical spindles fixed to the frame members 4, from which reels paper tapes 33 and 34 of a width equal to the spacing between the conveyors 5 and 6 may be drawn to extend along the edges of the adjacent conveyor runs.

In producing building boards by the method of this invention, wooden sheets 30 and 31 are pushed parallel to the members 4 into the receiving end of the apparatus, the sheet 30 being supported on top of the frame 9 and the sheet 31 being supported under the frame 9. The sheets 30 and 31 are then gripped by the conveyors 5 and 6 and are drawn towards the discharge end of the apparatus. The frame 9 is reciprocated by the piston rod 11, and the ingredients for the polyurethane foam are supplied through the pipes 14, 15 and 16. After mixing in the chamber 12, the latent-foaming polyurethane liquid is dispensed on to the sheet 31 between the sheets 30 and 31 through the nozzle 13. As the sheets 30 and 31 move away from the nozzle, the delay in reaction of the polyurethane mixture passes, so that the mixture begins to foam, and foaming continues until the space between the sheets is filled with cellular polyurethane material 32. The sheets 30 and 31, which constitute the outer skin of the board are pressed outwardly by the pressure developed in the foam and are prevented from separating by the conveyors 5 and 6. Lateral escape of the foam is prevented by the application to the edges of the sheets 30 and 31 of the tapes 33 and 34, which may, if desired, be stripped from the boards after the foam has set. The conveyors 5 and 6 are of such a length and speed that the foam sets before the completed building board is discharged from the apparatus.

The limited inward rotation of the nozzle 13 by the rack 17 reduces the surface density of the latent-foaming polyurethane applied to the sheets 30 and 31 at the edges, where the surface density would otherwise be excessive due to the deceleration of the frame 9 at either limit of reciprocation, resulting in compression of the foam at the edges with consequent non-uniformity of the structure of the foam.

By suitable selection of the shaped surface 21, it is possible to vary the internal structure of the sandwich board; for example, by foaming with shallow notches in the surface 21, the nozzle 13 is deflected to deposit very little liquid along a strip extending the full length of the sheet 31 so that the finished sandwich board will contain a cavity within which water pipes, electric wiring or the like may be located. By suitable arrangement of notches in the shaped surface 21, it is possible to so vary the deposition of the latent-foaming polyurethane liquid on the sheet 31 that the foam, if allowed to expand unimpeded, would have an upper surface roughly corresponding to the shape of a conventional ribbed or corrugated building sheet. If such a sheet is employed as the sheet 30, the use of the notched surface 21 results in minimum compression and distortion of the foam by the ribs or corrugations in the sheet 30, with consequent improvement in the uniformity of the cellular structure and in the properties of the sandwich board.

I claim:
1. In a method of continuously producing rigid skinned foam sandwich board, having the steps of continuously moving two substantially rigid sheets, one above the other and at the spacing of the finished sandwich board, horizontally up to and past a dispensing station, and at the dispensing station reciprocating a single dispenser nozzle laterally between the sheets, while supplying through the dispenser nozzle to the upper surface of the lower sheet a latent-foaming liquid capable of forming solid polymeric foams, and maintaining the spacing of the skins constant during foaming and solidification of the latent-foaming liquid, the improvement in the process comprising the step of intermittently turning the dispenser nozzle laterally with respect to the direction of travel of the sheets during reciprocation of the dispenser nozzle.

2. A method according to claim 1 wherein the latent-foaming liquid is a mixture reacting to form a polyurethane foam.

3. Apparatus for continuously producing rigid skinned foam sandwich board comprising: first support means adapted to maintain two horizontal substantially rigid sheets constituting the skins spaced one above the other at the spacing of a finished sandwich board, a dispensing nozzle carried by said first support means, means reciprocating the nozzle laterally between the sheets, means supplying to the nozzle a latent-foaming liquid capable of forming solid polymeric foams, board conveying means, and second support means limiting the separation of the sheets during foaming and solidification of the latent-foaming liquid, and means for intermittently turning said dispensing nozzle laterally to the direction of travel of the sheets during reciprocation of the nozzle.

4. Apparatus according to claim 3 wherein said means for intermittently turning said nozzle includes a cam-follower operatively connected to said dispensing nozzle and mounted in contact with a cam surface, said cam surface having a shape which dictates lateral movements to said reciprocating dispensing nozzle as said cam follower moves across said cam surface during reciprocation of said dispensing nozzle.

5. Apparatus according to claim 3 and including deflecting means capable of turning the dispensing nozzle toward the interior of the space between the sheets during the approach of said nozzle towards its point of reciprocation.

References Cited
UNITED STATES PATENTS

| | | | |
|---|---|---|---|
| 3,090,078 | 5/1963 | Ackles | 264—45 |
| 3,124,835 | 3/1964 | Celano et al. | 18—4 |
| 3,159,514 | 12/1964 | McKnight et al. | 264—45 X |
| 3,167,603 | 1/1965 | Lillie | 264—47 |
| 3,172,072 | 3/1965 | Willy | 264—47 X |
| 3,174,887 | 3/1965 | Voelker | 264—45 X |
| 3,249,486 | 3/1966 | Voisinet et al. | 264—54 X |
| 3,281,510 | 10/1966 | Lovret | 264—47 |

ALEXANDER H. BRODMERKEL, *Primary Examiner.*

P. E. ANDERSON, *Assistant Examiner.*